July 15, 1947.　　　　O. SCHLÄPFER　　　　2,424,121
ELECTRIC GENERATING PLANT FOR THE PROPULSION OF VEHICLES
Filed April 19, 1945　　　3 Sheets-Sheet 1
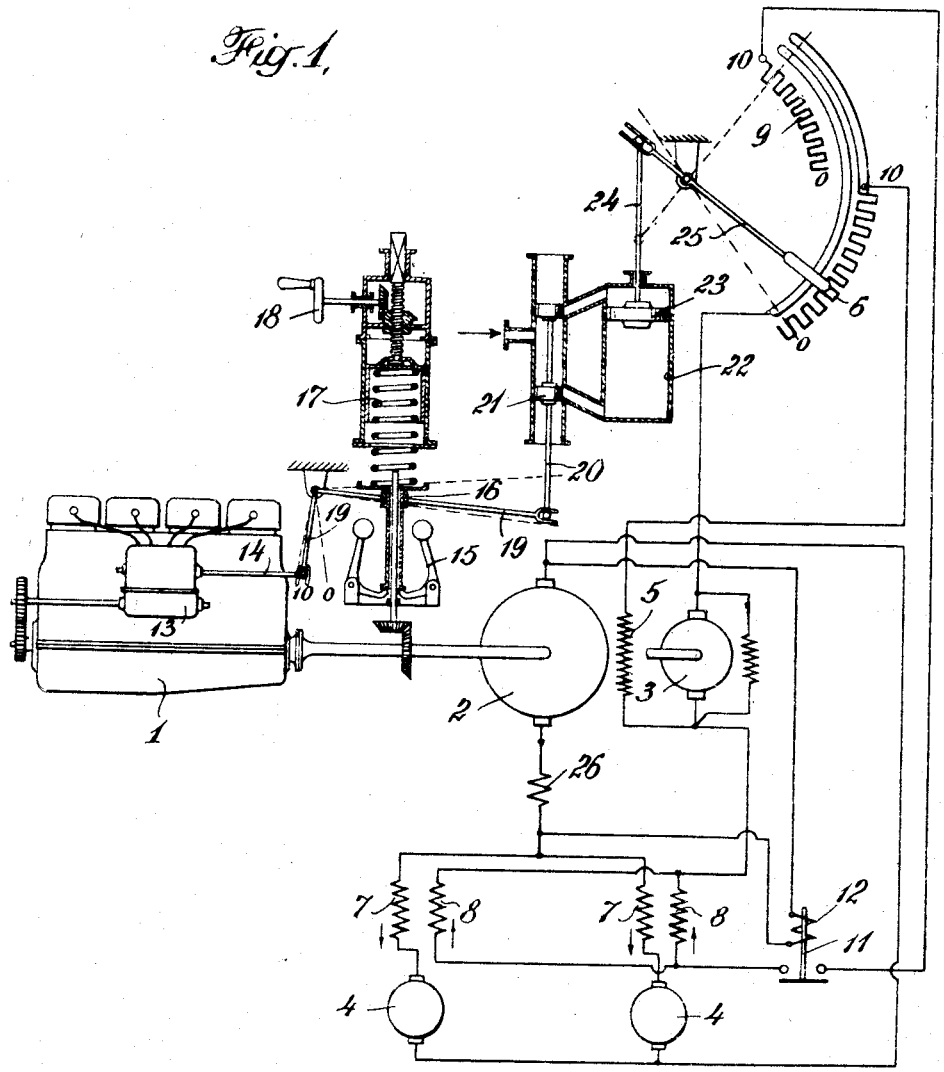
INVENTOR
OSKAR SCHLÄPFER
BY
ATTORNEYS

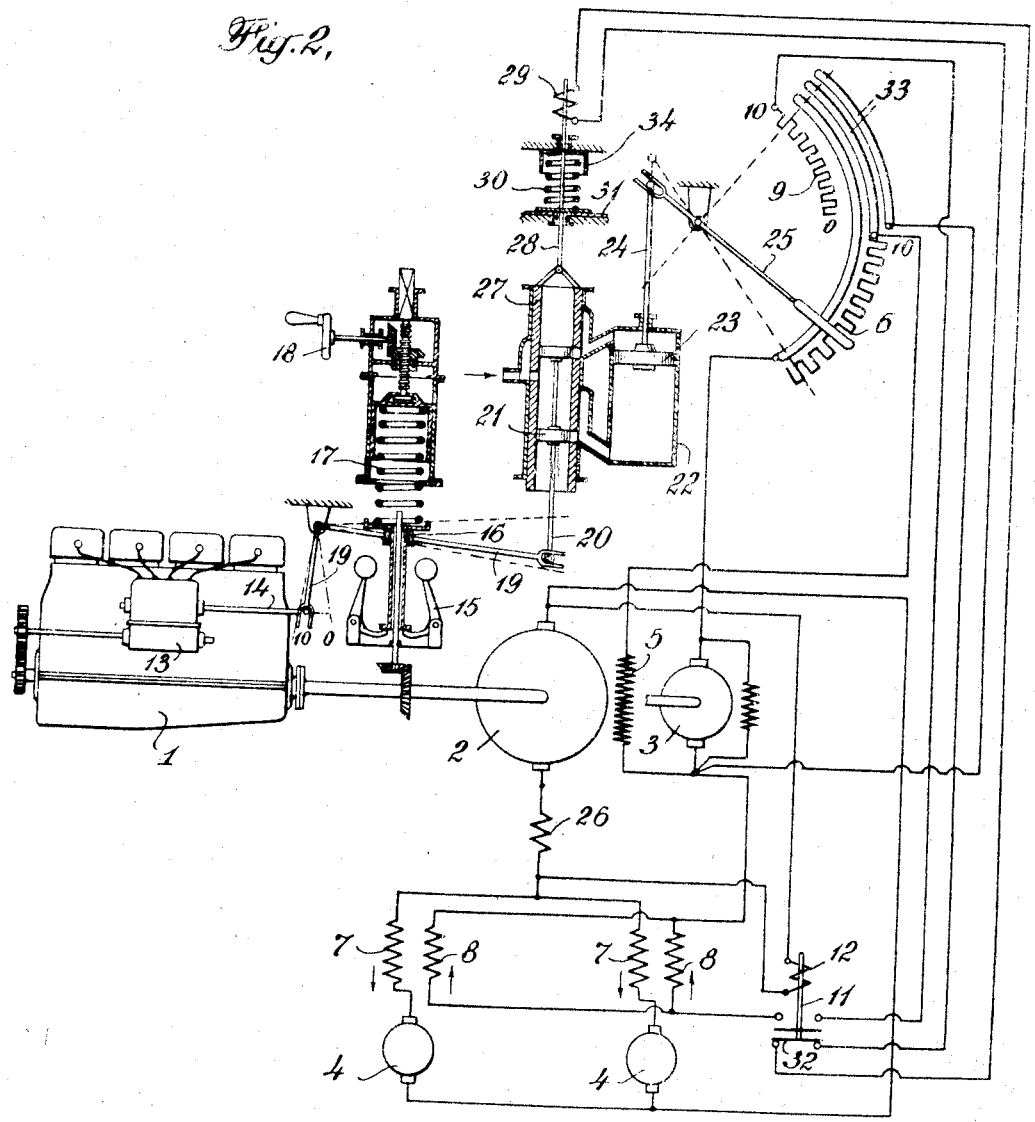

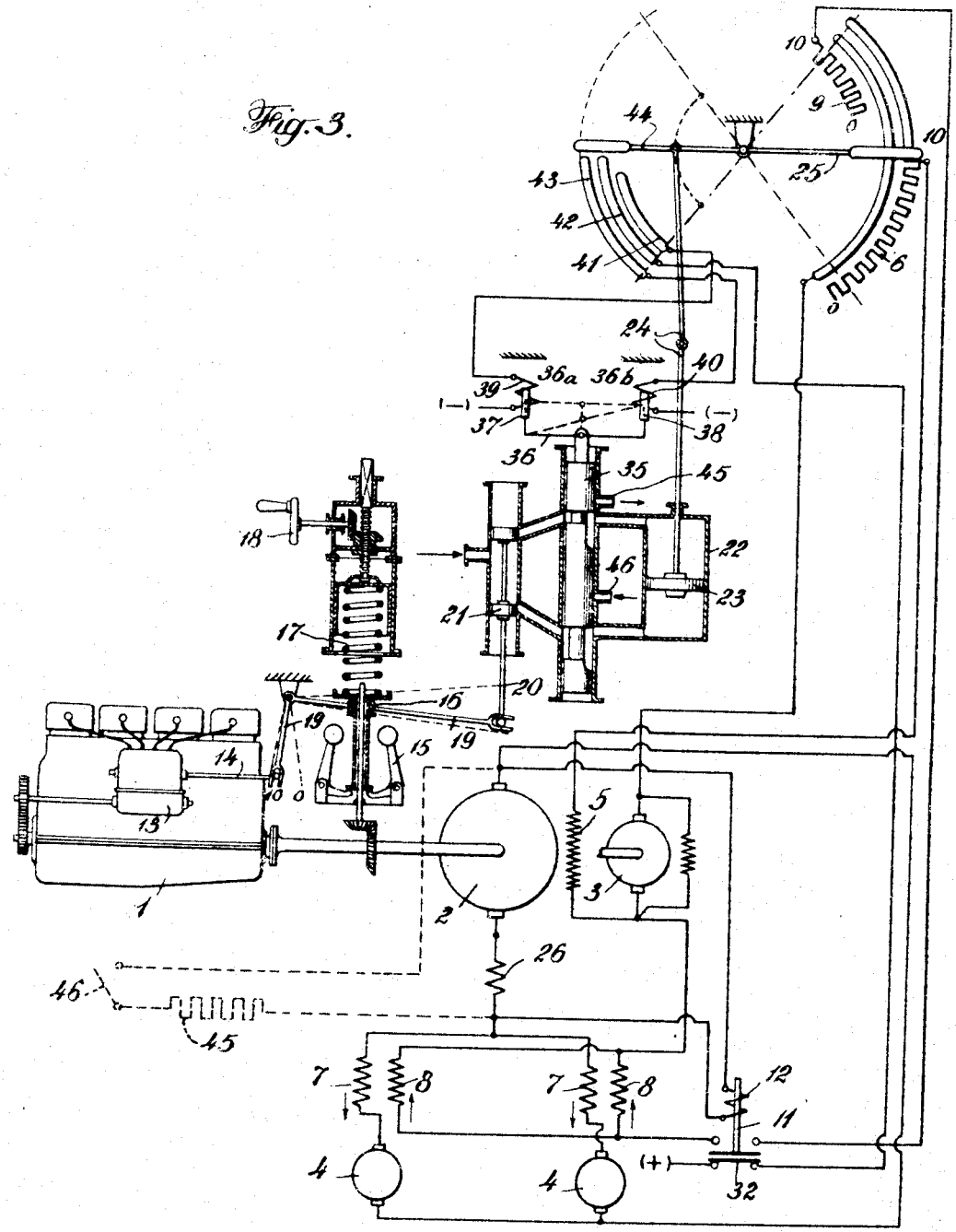

Patented July 15, 1947

UNITED STATES PATENT OFFICE 2,424,121

ELECTRIC GENERATING PLANT FOR THE PROPULSION OF VEHICLES

Oskar Schläpfer, Winterthur, Switzerland, assignor to Sulzer Freres, Societe Anonyme, Winterthur, Switzerland Application April 19, 1945, Serial No. 589,106
In Switzerland January 30, 1945

4 Claims. (Cl. 290—17)

The invention relates to an electric generating plant for the propulsion of vehicles with a generator driven by an internal combustion engine and an automatic regulating device which adjusts the fuel supplied to the internal combustion engine and the current of one or more field windings of the generator in accordance with the speed of the engine and the generator, in particular for the propulsion of rail vehicles. The invention is characterised in that a governor of the internal combustion engine adjusts not only the fuel and field current of the generator but also current for the counter-excitation of one or more driving motors when the field regulator for the generator has reached the position in which the field resistance is short-circuited and the voltage at the terminals of the generator has reached a prescribed minimum value.

The circuit of the counter-excitation can be interrupted by means of an automatic switch device as long as the voltage at the terminals of the generator remains below the prescribed value. The field regulator of the generator and the counterfield regulator of the driving motors may be combined and may have a common switch contact which is brought from the position on the counter-field regulator into a position between the counterfield regulator of the driving motors and the field regulator of the generator by means of a return device when the voltage at the terminals of the generator is below the prescribed value. The common switch contact may also be held in the position between the two regulator parts by means of a fixing device when the prescribed minimum voltage for the counterfield regulation at the terminals of the generator is not yet reached.

Three generator plants serving to drive a rail vehicle are shown as embodiments of the invention in a simplified form in Figs. 1–3 of the drawing.

The internal combustion engine 1 (Figs. 1–3) drives a main generator 2 and an auxiliary generator 3. The current of the main generator is employed for feeding the driving motors 4. Between the generator 2 and the driving motors 4 are arranged switching apparatus for the service of the vehicle (e. g., reversing switch, maximum switch, etc.), but these are not shown in the drawings, as they are not of significance for the invention. The auxiliary generator 3 feeds the field winding 5 of the main generator 2. For regulating the field current the field regulator 6 is employed, which is short-circuited in the position 10 and in the position 0 sets the greatest resistance.

The driving motors 4 each have a series field 7 through which the main current flows and a counter-field 8 which acts in opposition to the series field. The counter-field is fed by the auxiliary generator 3 and regulated by the counter-field regulator 9. In position 10 this counter-field regulator is short-circuited, while in position 0 it sets the greatest resistance. Provided in the circuit of the counter-field 8 is further a relay 11 controlled by a magnet 12. The magnet 12 is connected to the terminals of the main generator 2 and when a certain voltage is reached it closes the relay 11.

The engine 1 has a fuel pump 13 which is regulated by a linkage 14. In the position 0 of the fuel regulating linkage 14 no fuel is delivered, while in the position 10 the maximum quantity is injected into the working cylinder.

A governor 15 of centrifugal design serves to adjust the field regulator 6, the counter-field regulator 9 and the fuel regulator 14. The governor collar 16 is subjected through the spring 17 to a load which can be adjusted by means of the handwheel 18. The two-armed regulating lever 19 is linked to the collar at a point in the interior of the longer arm. At the end of the longer arm the valve rod 20 is attached, and at the end of the shorter arm the fuel regulating rod 14.

The slide valve 21 connected to the rod 20 controls the supply and discharge of a pressure medium for the servomotor 22. The piston 23 adjusts the regulating lever 25 of the field regulator 6 and of the counter-field regulator 9 through the rod 24.

The generator 2 possesses, apart from the field winding 5 fed by the auxiliary machine 3, a counter-compound winding 26 which forces on the generator 2 a rapidly falling voltage-current characteristic. By this means a course is obtained for the voltage-current characteristic of the generator which adapts itself more or less to constant output of the engine. The other differences between the characteristic of the generator and the curve for constant output are overcome by the field regulator 6 in that the load on the engine 1 is brought by the generator 2, by means of a change in the field current, to exactly the value of the constant output of the engine as set.

The required value for the speed of the engine is set by means of the handwheel 18. If the fuel regulator, independently of the field regulator, could influence the engine alone, the required speed value set would be re-established by a corresponding change in the fuel quantity. As, however, the fuel regulator is coupled to the field regulator, a state of equilibrium of the whole regulating device can only occur when the valve 21 covers the two control passages of the servomotor 22. This state of equilibrium corresponds only to a quite definite fuel quantity, since the position of the valve 21 also fixes the position of the fuel regulating linkage 14. The engine will then give an output corresponding to this definite fuel quantity. The field regulator now has the duty of setting the electric load on the generator in such a way that the generator loads the engine in accordance with the given output, with the result that the speed set by the handwheel 18 is maintained.

If the loading of the engine by the generator 2 falls below the output given by the set fuel quantity, the speed increases and the governor collar 16 moves into a higher position. The fuel regulator 14 then temporarily decreases the fuel quantity and with it the output of the engine. At the same time the valve 21 allows pressure medium to flow to the upper side of the servomotor piston 23 and pressure medium to flow off from the lower side correspondingly. The piston moves downwards and in this way the resistance of the field regulator 6 is decreased by the lever 25 and the field of the main generator is correspondingly strengthened. The load on the engine 1 is then once more brought to the value corresponding to the speed set. The governor 15, the valve 21 and the fuel regulator 14 now come back into their old position corresponding to the required normal value of the speed, in which position the valve covers its two control passages. This new position of equilibrium may already present itself when the governor lever 25 is still within the range of the field regulator 6. If, however, the state of equilibrium is not established when the governor lever 25 has reached position 10 of the field regulator 6—and the regulating resistance for the field current is thus short-circuited—the lever 25 slides further on to the counter-field regulator 9.

The action of the counter-field regulator 9 differs according as the relay 11 is closed or opened. This relay is open as long as the voltage at the terminals of the main generator 2 has not yet reached a prescribed value corresponding to the design of the vehicle. The relay is closed only when this minimum voltage at the terminals of the main generator is reached. If the voltage again sinks below the minimum, the relay is again opened.

If in the plants shown in Figs. 1–3 the terminal voltage of the main generator 2 is high enough and if the regulator lever 25 moves into the range of the counter-field regulator 9, the counter-field windings 8 are more or less excited according to the position of the regulator lever 25. In this way the total field of the driving motors 4 is altered so that the driving motors absorb current of greater strength and load the generator 2 more heavily. This increase continues until the loading of the internal combustion engine by the main generator 2 corresponds to the output of the engine at the set normal value of the speed. If in the position 10 of the counter-field regulator 9 the load on the engine at maximum field weakening of the driving motors should not yet be adapted to the normal value, a reduction of the fuel supply results and with it a reduction of the output with a corresponding increase in the speed of engine and generator.

If the load on the engine rises above the output given by the quantity of fuel supplied, the speed diminishes and the governor collar 16 falls into a lower position. The fuel regulator 14 then temporarily increases the fuel quantity and thus the output of the engine. At the same time the valve 21 also permits pressure medium to flow to the lower side of the servomotor piston 23 and pressure medium to flow off correspondingly from the upper side, so that the piston moves upwards and in this way strengthens the resistance of the field regulator 6 by means of the regulator lever 25. Thus the field of the main generator is reduced and the load on the engine 1 is again brought to a value at which the set required value of the speed is maintained.

If in the plant shown in Fig. 1 the relay 11 is still in the open position owing to the voltage at the terminals of the main generator 2 being too low, the regulator lever 25, after passing the position 10 of the field regulator 6, will simply continue towards the end position 10 of the counter-field regulator. If meanwhile an increased load on the engine does not present itself, the fuel quantity is reduced by a further rise of the governor collar 16. If after repeated increases of load the speed falls below the required value set, the regulator lever 25 will again move towards the position 0 of the counter-field regulator and, upon passing the position 0, will again regulate the field of the main generator 2 in the range of the field regulator 6.

In the plant shown in Fig. 2 the valve 21 is further surrounded by a hollow slide valve 27 which can be attracted through a rod 28 by a magnet 29. When the magnet is not excited the valve 27 is pressed by the spring 30 into the lower position fixed by the stop 31. The magnet 29 is excited through the contact 32 of the relay 11 and the contact bars 33 by the auxiliary generator 3. The valve 27 is then drawn into its upper position fixed by the stop 34. In this way it is brought about that the regulating lever 25 remains between the position 0 of the counterfield regulator 9 and the position 10 of the field regulator 6 as long as the voltage at the terminals of the main generator 2 has not reached the value at which the relay 11 is attracted by the magnet 12 and the load on the engine does not yet correspond to the value required. The end is thus achieved that the regulator lever 25 can move on to the field regulator 6 without delay if the load of the main generator 2 rises above the normal value of the output of the engine. The output and the speed of the engine will thus diverge from the normal value during the loading process at most by a very small amount.

In the plant shown in Fig. 3 there is provided between the valve 21 and the servomotor 22 a further control valve 35 which is connected through a yoke lever 36 to the armatures 37 and 38 of the magnets 39 and 40. The magnet 39 can be connected up to the auxiliary generator 3 through the contact bars 41 and 42 and the contact 32 of the relay 11. The magnet 40 can also be connected to the auxiliary generator 3 through the contact bars 42 and 43 and the contact 32 of the relay 11. The extension 44 of the regulator lever 25 slides over the bars 41, 42 and 43 in such a way that between the bars 42 and 43 a connection is established when the regulator lever 25 is situated between the position 10 of the field regulator 6 and the position 0 of the counter-field regulator 9. The connection between bars 41 and 42 is only established when the regulator lever 25 approaches the position 0 of the counter-field regulator 9. Thus, in cases in which the voltage of the main generator 2 is not sufficient to attract the relay 11, the regulator lever 25 is held at rest within the range between the position 10 of the field regulator 6 and the position 0 of the counter-field regulator 9, when the load on the engine also remains below the normal value in the position 10 of the field regulator 6.

If the relay 11 is in the position shown in Fig. 3 and if the load on the engine is smaller than its output, the speed of the engine rises. In this way the valve 21 is raised and pressure medium supplied to the upper side of the piston 23. The regulator lever 25 thus moves towards the counterfield regulator 9, the regulator lever 44 first connecting the bars 42 and 43 to each other. In this way the magnet 40 is excited and the yoke lever 36 brought into the position 36a. The supply of pressure fluid to the upper side of the piston 23 is now interrupted and at the same time the connection is established with the discharge 45, so that the movement of the piston 23 is interrupted.

If the regulator lever 25 is in the range of the counter-field regulator 9—for instance during restarting after a stoppage—the bars 41 and 42 are also connected; then both magnets 39 and 40 are excited, so that the yoke lever 36 comes into the position 36b. A connection is then established not only between the upper side of the piston 23 and the discharge 45 but also between the lower side of the piston 23 and the supply pipe 46. The piston 23 is then rapidly brought into a position between the position 0 of the counter-field regulator 9 and the position 10 of the field regulator 6. By this device the end can also be achieved that, when the vehicle is starting up, the field of the driving motors 4 is not weakened and that the regulator lever 25 can at once move on to the field regulator 6 when required.

Still further points of consumption may be connected up to the main and auxiliary generators. Thus for instance, as shown in Fig. 3, the heating system 45 of the train may be connected to the main generator, and this may be switched in and out by means of the switch 46. As particularly in vehicles which travel in flat country the voltage of the main generator remains unchanged in the whole field weakening range of the driving motors, a favourable course is also obtained for the voltage of the heating system.

I claim:

1. Plant for propulsion of vehicles comprising an internal combustion engine, a speed governor adjusting the fuel supply to said engine, an electric generator driven by said engine having a field winding and a regulator in the circuit of said field winding, at least one electric driving motor receiving electric power from said generator having a field winding, a counterfield winding and a regulator in the circuit of said counterfield winding and means influenced by the voltage of the generator and interrupting the counterfield current when the voltage of the generator does not reach a predetermined value, said field regulator and counterfield regulator being controlled by the speed governor of the internal combustion engine, so as to first increase the field of the generator and secondly to weaken the field of the motor by increasing its counterfield.

2. Plant for propulsion of vehicles comprising an internal combustion engine, a speed governor adjusting the fuel supply to said engine, an electric generator driven by said engine having a field winding and a regulator in the circuit of said field winding, at least one electric driving motor receiving electric power from said generator having a field winding, a counterfield winding, a regulator in the circuit of said counterfield winding and means influenced by the voltage of the generator and interrupting the counterfield current when the voltage of the generator does not reach a predetermined value, the resistance of said counterfield regulator being arranged in continuation of the resistance of said field regulator, both resistances having a common switch contact controlled by the speed governor of the engine.

3. Plant for propulsion of vehicles comprising an internal combustion engine, a speed governor adjusting the fuel supply to said engine, an electric generator driven by said engine having a field winding and a regulator in the circuit of said field winding, at least one electric driving motor receiving electric power from said generator and having a field winding, a counterfield winding and a regulator in the circuit of said counterfield winding, the resistance of said counterfield regulator being arranged in continuation of the resistance of said field regulator, both resistances having a common switch contact, a servomotor for controlling the switch contact, a controlling apparatus influenced by the speed governor and controlling the servomotor, means influenced by the voltage of the generator and influencing in addition said controlling apparatus, so as to bring it back from positions on the counterfield regulator to a position between the two regulators when the voltage of the generator does not reach a predetermined value.

4. Plant for propulsion of vehicles comprising an internal combustion engine, a speed governor adjusting the fuel supply to said engine, an electric generator driven by said engine having a field winding and a regulator in the circuit of said field winding, at least one electric motor receiving electric power from said generator and having a field winding, a counterfield winding and a regulator in the circuit of said counterfield winding, the resistance of said counterfield regulator being arranged in continuation of the resistance of said field regulator, both resistances having a common switch contact, a servomotor for controlling the switch contact, a controlling apparatus influenced by the speed governor and controlling the servomotor, means influenced by the voltage of the generator and influencing in addition said controlling apparatus, so as to bring it back from positions on the counterfield regulator to a position between the two regulators, means connected to the switch contact and to the voltage influenced means and influencing the controlling apparatus so as to hold the switch contact in a position between the two regulators after it is brought back from positions on the counterfield regulator and when the voltage does not reach a predetermined value.

OSKAR SCHLÄPFER.

REFERENCES CITED

The following references are of record in the file of this patent:

UNITED STATES PATENTS

| Number | Name | Date |
| --- | --- | --- |
| 859,813 | Powell | Sept. 10, 1907 |
| 1,833,017 | Cutler | Nov. 24, 1931 |
| 2,131,527 | Sousedik | Sept. 27, 1938 |
| 2,145,611 | Schlaepfer | Jan. 31, 1939 |
| 2,182,640 | Schaelchlin | Dec. 5, 1939 |
| 2,290,867 | Curry | July 28, 1942 |
| 2,363,377 | Wrathall | Nov. 21, 1944 |
| 2,393,619 | Edwards | Jan. 29, 1946 |
| 2,393,622 | Adams et al. | Jan. 29, 1946 |